US010853888B2

(12) United States Patent
Plonski et al.

(10) Patent No.: US 10,853,888 B2
(45) Date of Patent: Dec. 1, 2020

(54) COMPUTING VALIDATION AND ERROR DISCOVERY IN COMPUTERS EXECUTING A MULTI-LEVEL TAX DATA VALIDATION ENGINE

(71) Applicant: ADP, LLC, Roseland, NJ (US)

(72) Inventors: Michael Oliver Plonski, Long Beach, CA (US); Ajit Sri Kumar, La Verne, CA (US); Onkarnatha Reddy Gangireddy, Telangana (IN); Sivaram Kappaganthu, Telangana (IN); Sharath Vaddireddy, Telangana (IN); Surya Sastry Bhagavat Bhamidi, Arcadia, CA (US); Sarada Ambatipudi, Arcadia, CA (US)

(73) Assignee: ADP, LLC, Roseland, NJ (US)

( * ) Notice: Subject to any disclaimer, the term of this patent is extended or adjusted under 35 U.S.C. 154(b) by 323 days.

(21) Appl. No.: 15/409,594

(22) Filed: Jan. 19, 2017

(65) Prior Publication Data

US 2018/0204290 A1 Jul. 19, 2018

(51) Int. Cl.
*G06Q 40/00* (2012.01)
*G06N 20/00* (2019.01)
*G06Q 10/00* (2012.01)

(52) U.S. Cl.
CPC .......... *G06Q 40/123* (2013.12); *G06N 20/00* (2019.01)

(58) Field of Classification Search
CPC ...... G06Q 40/123; G06Q 10/10; G06Q 40/00; G06Q 10/1057; G06Q 40/125;

(Continued)

(56) References Cited

U.S. PATENT DOCUMENTS 6,401,079 B1 * 6/2002 Kahn .................. G06Q 20/102
705/30
6,633,855 B1 * 10/2003 Auvenshine ............ G06F 16/00
706/15

(Continued)

OTHER PUBLICATIONS

Lakshmi, et al., "Machine Learning Approach for Taxation Analysis using Classification Techniques," International Journal of Computer Applications (0975-8887), vol. 12—No. 10, Jan. 2011, 6 pages.

(Continued)

*Primary Examiner* — Ariel J Yu
*Assistant Examiner* — Dana Amsdell
(74) *Attorney, Agent, or Firm* — Yee & Associates, P.C.

(57) ABSTRACT

A computer-method for improving operation of a computer by validating incoming data provided to a tax evaluation software program. The computer-implemented method includes selecting a gate at which the data is to be validated. Selecting is performed from among a plurality of gates. Each of the plurality of gates comprises a corresponding pre-selected organization of validation rules which at least specifies a corresponding level of validation. The gate has a particular organization of validation rules at a particular level of validation. The computer-implemented method also includes validating the data at the gate. The computer-implemented method also includes performing machine learning analysis on the operation of validating the data to determine an applicability of other rules in other gates. The computer-implemented method also includes, responsive to detecting a failure in validation of the data at the gate, generating, and displaying on a display device, a cause for the failure.

19 Claims, 8 Drawing Sheets

(58) Field of Classification Search
CPC ..... G06F 21/6218; G06F 16/00; G06N 5/043; G06N 5/022; G06N 20/00
See application file for complete search history.

(56) References Cited

U.S. PATENT DOCUMENTS

| | | | | |
|---|---|---|---|---|
| 8,407,113 | B1* | 3/2013 | Eftekhari | G06Q 40/123 705/31 |
| 8,498,910 | B1* | 7/2013 | Grossblatt | G06Q 40/125 705/32 |
| 8,589,262 | B1* | 11/2013 | Wang | G06F 17/27 382/137 |
| 10,140,666 | B1* | 11/2018 | Wang | G06Q 40/123 |
| 10,705,796 | B1* | 7/2020 | Doyle | G06F 7/08 |
| 2002/0022982 | A1* | 2/2002 | Cooperstone | G06Q 10/1057 705/1.1 |
| 2010/0161460 | A1* | 6/2010 | Vroom | G06Q 40/123 705/31 |
| 2012/0330971 | A1 | 12/2012 | Thomas et al. | |
| 2017/0018035 | A1* | 1/2017 | Shakir | G06Q 40/123 |
| 2017/0193397 | A1* | 7/2017 | Kottha | G06N 20/00 |
| 2018/0032855 | A1* | 2/2018 | Wang | G06Q 50/18 |
| 2018/0174043 | A1* | 6/2018 | Po | G06N 3/08 |

OTHER PUBLICATIONS

DeBarr, et al., "Relational Mining for Compliance Risk," the IRS Research Bulletin: Recent IRS Research on Tax Administration and Compliance, Publication 1500, Washington, DC: IRS, 2004, 11 pages.

* cited by examiner

COMPUTING VALIDATION AND ERROR DISCOVERY IN COMPUTERS EXECUTING A MULTI-LEVEL TAX DATA VALIDATION ENGINE

BACKGROUND INFORMATION

1. Field

The present disclosure relates to methods and devices for addressing a problem with computers being unable to determine root causes of error that sometimes arise when executing a complex, multi-level tax data validation engine having many layers of information. More specifically, the present disclosure relates to a method and device for computing validation and error discovery in computers executing a multi-level tax data validation engine.

2. Background

Tax preparation software is a well-known convenience used by individuals and tax preparation professional alike. For large corporations or other entities, tax preparation may require highly complex tax preparation software. Some corporations or other entities offer the use of tax preparation software as part of a suite of Internet-provided services that may include, for example, payroll services or other human resources services. For such entities, the offered tax preparation software may take the form of an extremely sophisticated and large multi-level tax enterprise software suite.

In some cases, errors may arise in such software enterprises. However, due to the complexity of such enterprises, ordinary computers are sometimes unable to determine the root cause or causes of the errors. Thus, a need exists for a strictly computer-centric solution which can identify the root causes of errors in such software enterprises.

SUMMARY

The illustrative embodiments provide for a computer-implemented method for improving operation of a computer by validating incoming data provided to a tax evaluation software program. The computer-implemented method includes selecting a gate at which the data is to be validated. Selection is performed among a plurality of gates. Each of the plurality of gates comprises a corresponding pre-selected organization of validation rules, which at least specifies a corresponding level of validation. The gate has a particular organization of validation rules at a particular level of validation. The computer-implemented method also includes validating the data at the gate. The computer-implemented method also includes performing machine learning analysis on the operation of validating the data to determine an applicability of other rules in other gates. The computer-implemented method also includes, responding to detecting a failure in validation of the data at the gate, generating, and displaying, on a display device, a cause for the failure.

The illustrative embodiments also contemplate a computer, including a processor and a memory in communication with the processor. The memory stores instructions for implementing a computer-implemented method as described above. The illustrative embodiments also contemplate a non-transitory computer-recordable storage medium for storing computer-usable code for implementing a computer-implemented method as described above. The illustrative embodiments also include other features as described elsewhere, herein.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

Figure 1:
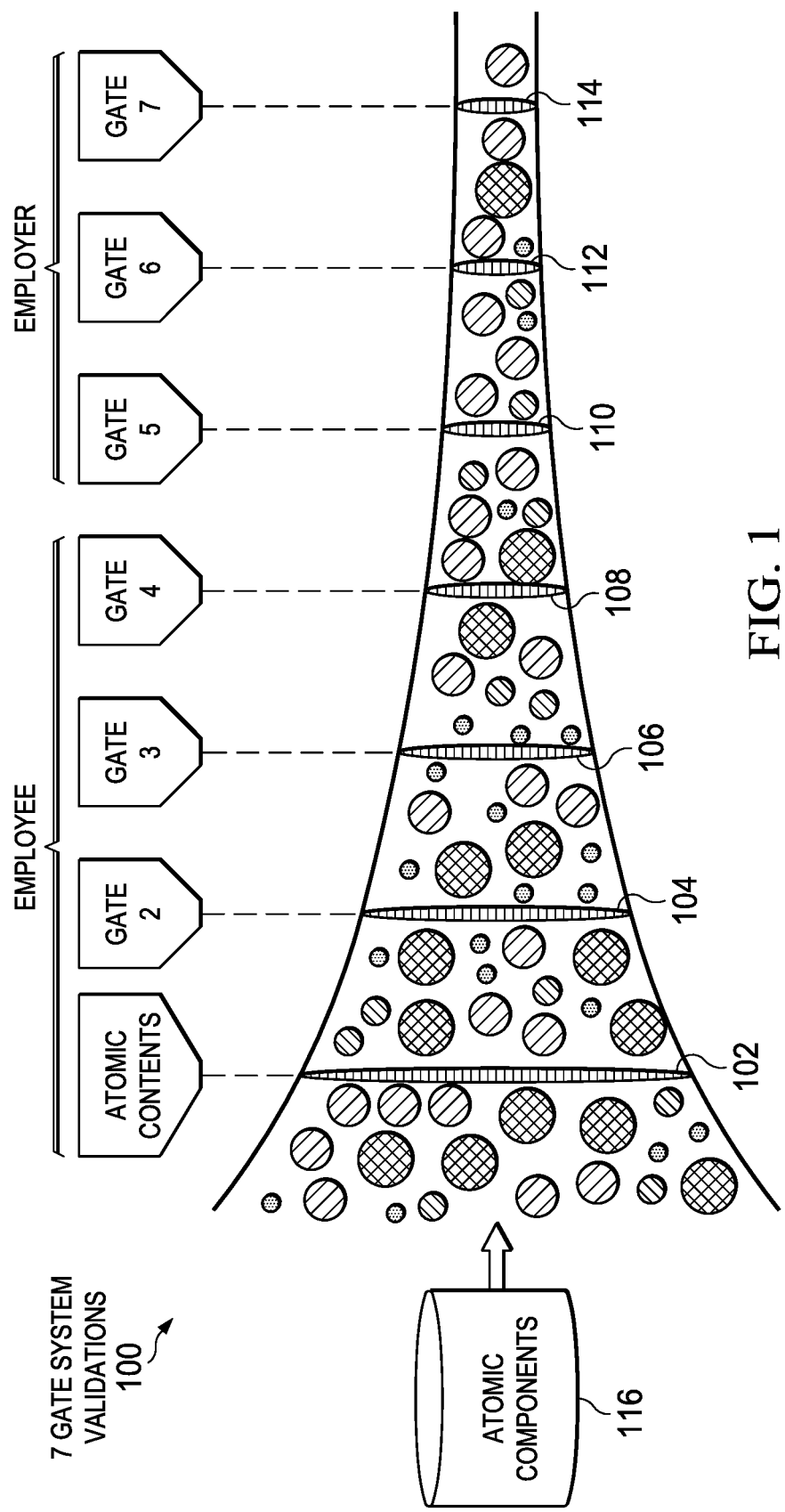
FIG. 1 is a diagram of a seven gates multi-level tax data validation engine in accordance with an illustrative embodiment.

The illustrative embodiments recognize and take into account that errors may arise in tax software enterprises. However, due to the complexity of such enterprises, ordinary computers are sometimes unable to determine the root cause or causes of the errors. Thus, a need exists for a strictly computer-centric solution which can identify the root causes of errors in such software enterprises The illustrative embodiments also recognize and take into account that validations replicated across the applications cause data issues. For example, odds are good that the rule might not have been defined correctly in all the applications, causing erroneous data to slip through the system and to be sent to agencies and clients. Thus, the illustrative embodiments ensure that the rule behind the validation is defined at once and can be monitored or corrected at once. Additionally, the data issues can be caught before sending filings to an agency rather than realizing after an agency notice or providing client information. In a specific example, for an employee, if the value of "Year to date wages" is less than a quarter to date wages, then a data issue exists, and the illustrative embodiments will catch this issue and either correct it or notify a user or an automated process of the error.

The illustrative embodiments also recognize and take into account that both humans and computers may be unable to determine the root cause of errors. For example, many wage and tax components are an accumulation of various atomic components. The existing tax system receives an accumulated amount and not the individual atomic component values. Because of this fact, detecting the responsible components for any given error is very difficult. The illustrative embodiments can receive atomic components, and hence, can find the correct atomic component that causes the error. Prior systems cannot perform this function.

The illustrative embodiments also recognize and take into account that cross reference of notices or amendments in relation to prior validations, may be unavailable. When supporting a client for the client's queries, or when analyzing an error identified within tax fields, with the lack of atomic and higher details of tax information, the tax support team will have to route the client or contact the payroll support team for further clarifications. The team will need to do this repeatedly until the query or the root cause of the issue is identified and fixed. This process is tedious and time consuming, with involvement of multiple layers of client support structures, and thus undesirable. The illustrative embodiments avoid these difficulties.

The illustrative embodiments also recognize and take into account that clients are impacted by errors at the end of the tax process. For example, current tax enterprise software may be unable to answer key client concerns regarding an error, such as, what is the issue, why is the issue happening, how can the issue be prevented, and how should the issue be handled and resolved.

The illustrative embodiments also recognize and take into account that, due to many layers of information, in some tax software enterprises, it is not easy to locate tax information. Since the existing system is a unified application, it receives a great deal of data that contains information about taxes, wage garnishments, child care, new hire reporting information, etc. Out of this data, the illustrative embodiments can segregate the information and apply the corresponding rules to the given information. For example, out of the vast amount of available information in an input file, the illustrative embodiments are able to apply only tax system rules on tax information, and also only garnishment rules on garnishments information.

The illustrative embodiments also recognize and take into account that data validation may be necessary in a tax software enterprise. Data validation may be used to determine if data is in the proper form to be processed. Data validation may be used to determine if data is complete. Data validation may be used to determine whether certain rules are applicable or should be applicable to a given set of tax data.

The illustrative embodiments also recognize and take into account that current tax software does not provide a combination of organization of validation rules at pre-determined levels of granularity, an integration of machine learning with the rules engine, and specific notifications of cause for the result of failures generated during operation of the rules engine. The illustrative embodiments specifically provide for machine learning and a rule-based tax data validation engine that provides multiple gates (levels) to validate incoming data and detailed explanations of data errors to be provided based on machine learning and rules.

The illustrative embodiments provide for organization of validation rules at gates. This organization allows for granularity by a rules engine. A user may enter through different gates with different data sets and still be able to validate with fewer inputs based on the gate entered.

The illustrative embodiments also provide for integration with machine learning with the rules engine to analyze applicability and need for specific rules. A human cannot remember the applicability of rules and the sheer number of rules. For example, machine learning tells us that only 1000 rules are needed, as opposed to 2000. Thus, the illustrative embodiments provide for the optimization of computer operation by minimizing the time required to validate data.

The illustrative embodiments also provide for explicit notification of the cause. The illustrative embodiments provide for notifying a user, or perhaps an automated program, of the exact cause, such as which field caused a rules failure, or why a particular rule failed. In the known tax data validation art, programs do not say why the program suggests or recommends something. Such software might provide a hint based on "you triggered X, so suggest rule Y", but does not say exactly why something failed or not. Prior software does not state which field data input failed. For example, if the rule is A=B+C, then a prior engine will report that it cannot calculate field A. However, the illustrative embodiments are able to report that field A cannot be calculated because the problem is in field B or C.

The illustrative embodiments also provide for using chained rules to check whether an outlier is legitimate or not. Thus, in the event of rule failure, the illustrative embodiments can determine whether the report of failure is a false positive or an actual rule failure. The illustrative embodiments described herein address these and other issues, as provided further below.

FIG. 1 is a diagram of a seven gates multi-level tax data validation engine, in accordance with an illustrative embodiment. Gate system 100 shows seven gates, including gate 102, gate 104, gate 106, gate 108, gate 110, gate 112, and gate 114, in order of increasing granularity. As used herein, the term "gate" is defined as a pre-selected organization of validation rules, which at least specifies a corresponding level of validation. Thus, a "gate" may also be considered a particular set of validation rules organized together by the level of detail at which rules within the set operate to validate data. A "gate" is executed as software by a processor or as firmware.

Gates may be organized in to groups. Thus, for example, gate 102, gate 104, gate 106, and gate 108 may be organized as sets of validation rules that apply to employees. In another example, gate 110, gate 112, and gate 114 may be organized as sets of validation rules that apply to employers.

In use, one or more gates are selected by a user, or perhaps by an automated validation program, for application to a given data set. Atomic components 116 of that data set are then provided to the selected gates, and the validation rules within those gates are applied to atomic components 116. The data is then validated according to the selected sets of rules. One or more gates may be applied to a given data set.

In a specific example, gate 102 may represent basic validation rules, such as rules that validate data type, data length, or formatting checks. In a more specific example, gate 102 may include rules such as, validating atomic data such as a qualified bicycle commuting reimbursement, spousal travel expenses reimbursements, qualified non-personal vehicle use, or checking parking benefits of non-personal vehicle use.

In another specific example, gate 104 may represent rules that compute dependent wage components and tax fields at an employee level. For example, a gate may be a combination of rules such as Rule 1: Working Condition Fringes=(Spousal Travel Expenses Reimbursements)+(Qualified non-personal vehicle use)+(Parking Benefits for non-personal vehicle use) combined with Rule 2: Federal Subjectable Wage=(Qualified Bicycle Commuting Reimbursement)+(Spousal Travel Expenses Reimbursements)+(Qualified non-personal vehicle use)+(Parking Benefits for non-personal vehicle use). In a different example, a gate may be a combination of rules such as Rule 1: Working Condition Fringes=(Spousal Travel Expenses Reimbursements)+(Qualified non-personal vehicle use)+(Parking Benefits for non-personal vehicle use) combined with Rule 2: Federal Subjectable Wage=(Spousal Travel Expenses Reimbursements)+(Qualified non-personal vehicle use)+(Parking Benefits for non-personal vehicle use).

In another specific example, gate 106 may represent rules that build employee rollups of atomic and computed fields at various levels. For example, rollup rules may be applied at different time periods such as monthly, quarterly, yearly, or other periods of time, or may be organized by social security number. The atomic components may include data, such as qualified bicycle commuting reimbursements, spousal travel expenses reimbursements, qualified non-personal vehicle use, parking benefits for non-personal vehicle use, working condition fringes, federal subjectable wage, and other suitable types of information.

In another specific example, gate 108 may represent rules that identify, execute, and take action based on validation rules against the rollup data at an employee level. For example, an employee validation rule could be a combination of Rule 1 which determines if "qualified bicycle commuting reimbursement" has exceeded the limit then validate if this is included in the "federal subjectable wage" combined with Rule 2 which validates to confirm if the amount falls under "de minimis fringe benefit". In another example, a third rule could be federal income tax taxable wage="federal subjectable wage"−"working condition fringes". In another example, a fourth rule could be federal income tax="federal income tax taxable wage" *"federal income tax agency tax rate". Similar rules may have to be applied at different levels and frequencies (monthly, quarter, yearly, periodic, by social security number, etc.)

In another specific example, gate 110 may represent rules that build employer rollups of atomic and computed fields at various levels. For example, gate 110 may represent rollup rules at different levels, including monthly, quarterly, yearly, periodic, by employer, by tax identification number, etc. The atomic components of employer rollups may include qualified bicycle commuting reimbursement=(employee1+employee2+employee4); spousal travel expenses reimbursements; qualified non-personal vehicle use; parking benefits for non-personal vehicle use; working condition fringes; federal subjectable wage; federal income tax taxable wage; and federal income tax.

In another specific example, gate 112 may represent rules that compute dependent wage components and tax fields at an employer level which could not be computed at the employee level. An example of such a rule might be Rule 1: FUTA Credit Reduction and SUI Less FUTA can be computed only after calculating the FUTA Taxable Wage, SUI Taxable Wages, SUI Taxes at Tax ID Level with YTD Rollup Frequency. Another such rule could be Rule 2: Massachusetts Health Tax. The liability can be identified for an employer only after knowing TAXID (QTD (SSN Count >6))) and the taxable wages and taxes can be computed accordingly at different rollup levels, such as employee, social security number, tax file number, tax identification number, and others.

In another specific example, gate 114 may represent rules that identify, execute, and take action based on validation rules against the rollup data at an employer level. An example of such an employer validation rule could be Rule 1: qualified bicycle commuting reimbursement at the employer level. Another example could be Rule 2: validate to confirm if the amount falls under the de minimis fringe benefit. Another example could be Rule 3: federal income tax taxable wage="federal subjectable wage"−"working condition fringes". Another example could be rule 4: federal income tax="federal income tax taxable wage" *"federal income tax agency tax rate". Another example could be similar rules that may have to be applied at different levels and frequencies.

The illustrative embodiments described with respect to FIG. 1 may be varied. For example, more or fewer gates may be present. The arrangement of levels of validation may be varied. In another example, the current arrangement in FIG. 1 is from coarser levels of granularity to higher levels of granularity, but the order of these levels of granularity could be reversed or mixed in some manner. In another example, more or fewer groups of gates may be present, and the groups presented may have more or fewer gates within them. In yet another example, particular gates may have rules addressed towards different aspects of validation other than those described above. More or fewer specific rules may be combined within individual gates. Thus, the claimed inventions are not necessarily limited by the examples provided herein.

Figure 2:
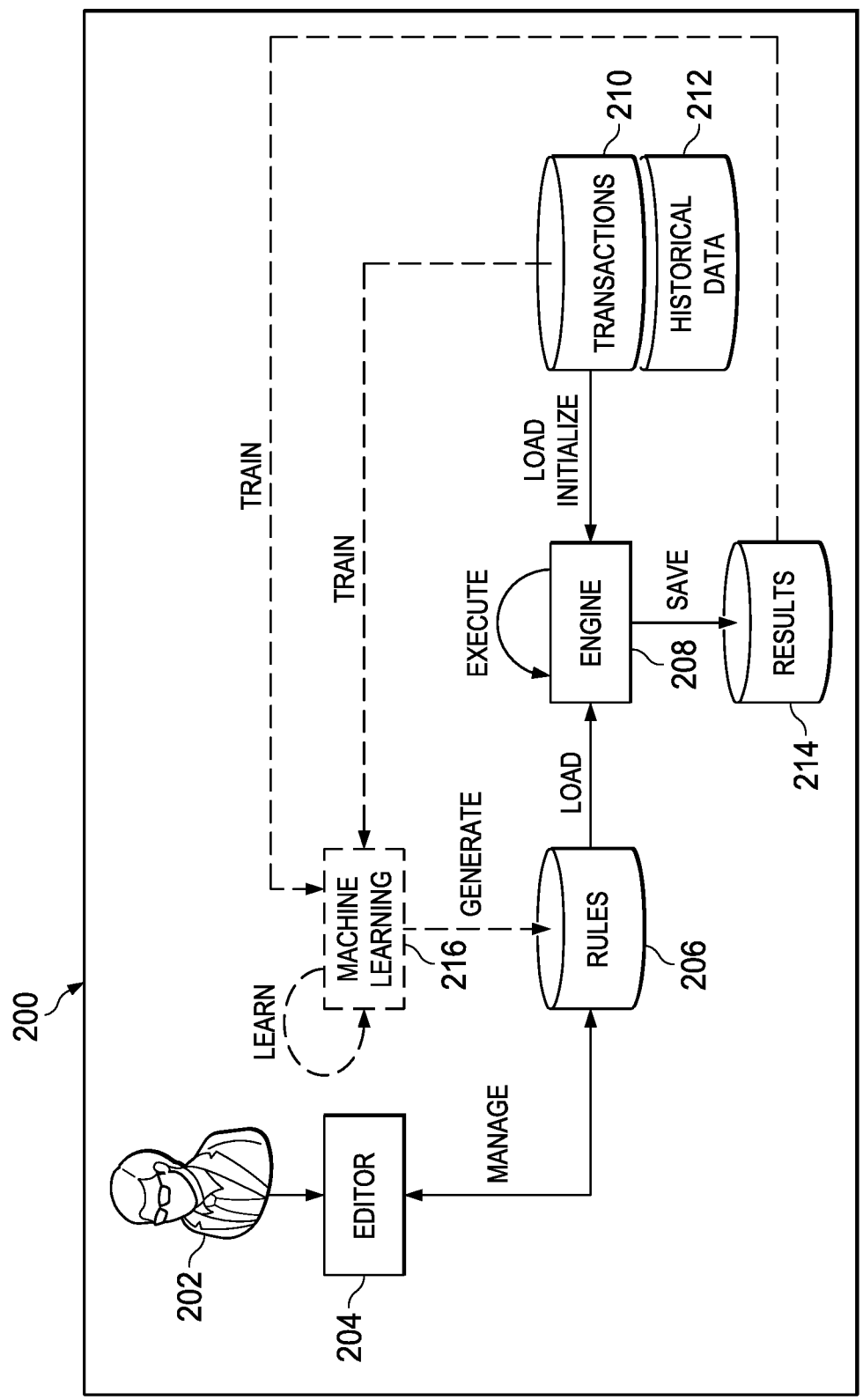
FIG. 2 is a block diagram describing machine learning integration into a multi-level tax data validation engine in accordance with an illustrative embodiment.

FIG. 2 is a block diagram describing machine learning integration into a multi-level tax data validation engine in accordance with an illustrative embodiment. Integration system 200 is an example of how a machine learning system can be used together with a rules validation engine to improve operation of a computer when executing a tax software enterprise system.

Initially, user 202 uses editor 204 to create and/or manage rules 206. Rules 206 may be stored in a non-transitory computer-recordable storage medium. Engine 208 loads rules 206. Engine 208 also may load or initialize transactions 210 and/or historical data 212 stored in one or more databases. Engine 208 may be a rules engine used to validate data, rules, or the application of data to rules. Engine 208 executes rules 206 to form results 214.

All of results 214, transactions 210, and historical data 212 can be fed into machine learning 216. Additionally, the execution analysis within engine 208 could also be provided to machine learning 216. Machine learning 216 may be commonly available machine learning firmware or software to perform machine learning, as known in the art. Machine learning 216 may be used to modify rules 206 for later execution of engine 208, or to pinpoint the exact root cause of an error that arises during the execution of engine 208. Additional information regarding the operation of machine learning 216 is provided with respect to FIG. 3.

Figure 3:
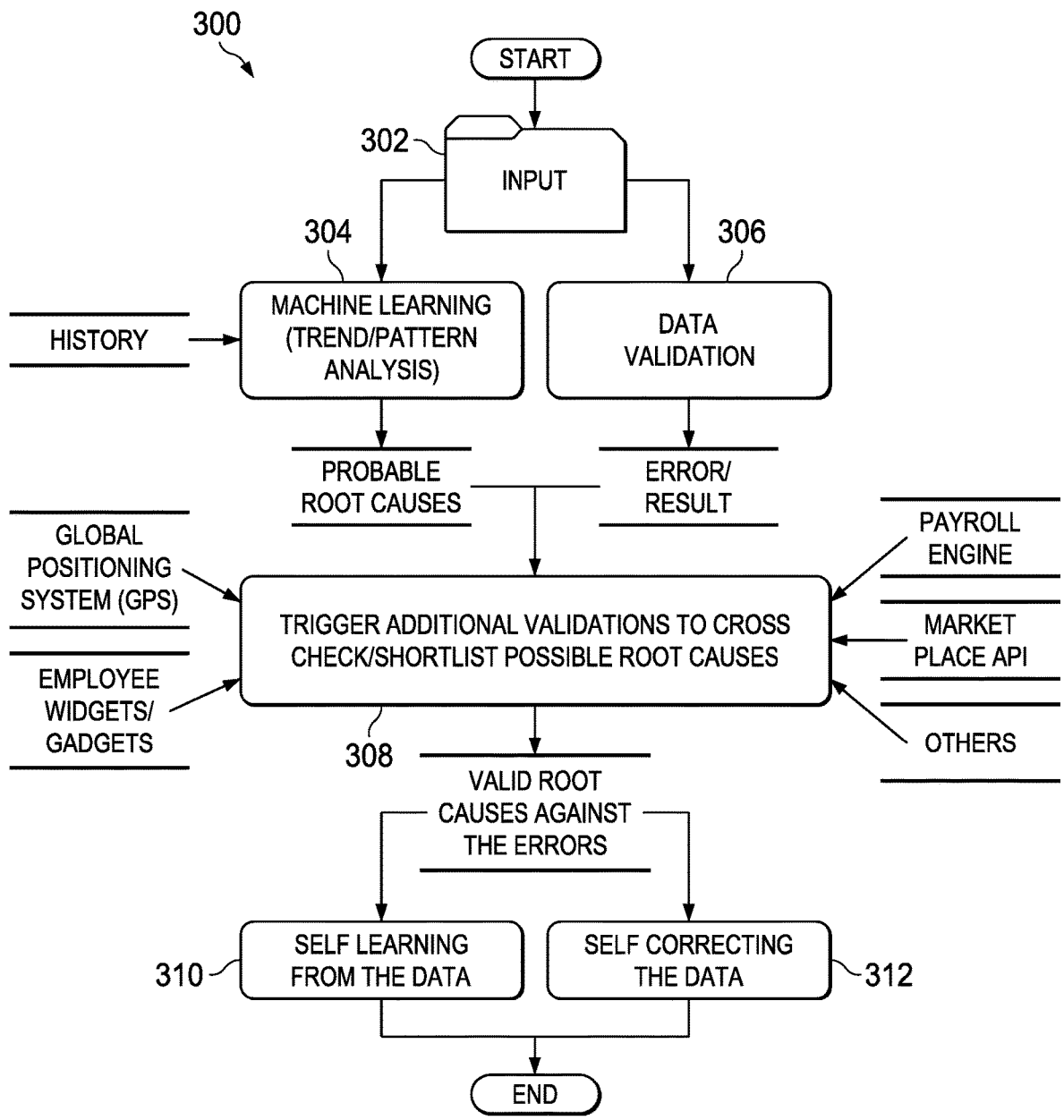
FIG. 3 is a flowchart for a computer-centric method for pinpointing the root cause of a computer-related error in accordance with an illustrative embodiment.

FIG. 3 is a flowchart for a computer-centric method for pinpointing the root cause of a computer-related error in accordance with an illustrative embodiment. Method 300 may be implemented using machine learning, such as machine learning 216 in FIG. 2.

Initially, input is received (operation 302). The input may be received or by a machine learning engine. Method 300 may then bifurcate. On one side, machine learning is used to perform trend and pattern analysis on the results of the operation of a rules engine, such as engine 208 in FIG. 2 (operation 304). The machine learning engine may take a variety of data as an input, including rules, history, results, and other information, such as described with respect to FIG. 2. A result of operation 304 is to produce probable root causes of error.

On the other side, after operation 302, data validation is performed (operation 306) using a rules engine, such as engine 208 of FIG. 2. Thus, data validation and operation of the machine learning may be concurrent. The result of data validation may be an error or successful validation.

Method 300 then returns to the next operation, which is to trigger additional validations to cross check the error result found and the probable root causes in order to create a short list of probable root causes of the error (operation 308). These additional validation actions could draw in additional sources of information, such as global positioning system data, employee widgets and gadgets data, payroll engine information, market place application programming interfaces, and other suitable types of information. A result of the additional validations is a determination regarding the valid root cause of the thrown errors. In one illustrative embodiment, the method bypass subsequent operation 310 and operation 312 and may terminate thereafter.

Optionally, additional steps may be present. For example, method 300 may also include self-learning from the data (operation 310). Operation 310 may be implemented using the learning machine. In another example, method 300 may also include self-correcting the data (operation 312). Operation 312 may also be implemented using the learning machine. In either case, or in both cases, the method may terminate thereafter.

Figure 4:
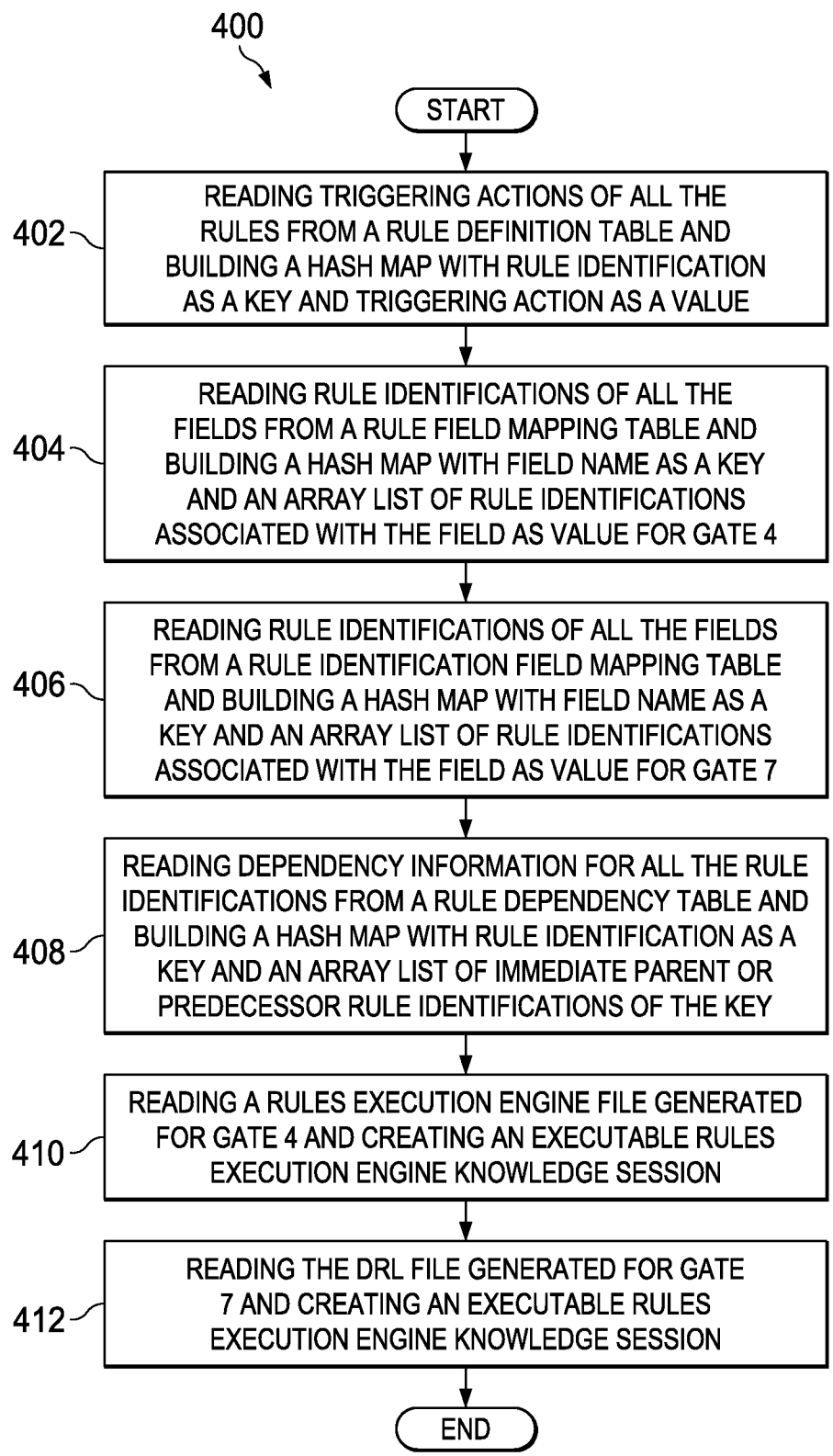
FIG. 4 is a flowchart of a process for loading static or read only data as part of a service activity when checking for root causes of a computer-related error in a multi-level tax data validation engine in accordance with an illustrative embodiment.

FIG. 4 is a flowchart of loading static or read-only data as part of a service activity when checking for root causes of a computer-related error in a multi-level tax data validation engine in accordance with an illustrative embodiment. Method 400 may be implemented using a processor or a learning machine, such as machine learning 216 shown in FIG. 2. Method 400 may be implemented in a system, such as integration system 200 of FIG. 2.

Method 400 includes reading triggering actions of all the rules from a rule definition table and building a hash map with rule identification as a key and triggering action as a value (operation 402). Method 400 then includes reading rule identifications of all the fields from a rule field mapping table and building a hash map with field name as a key and an array list of rule identifications associated with the field as value for gate 4 (operation 404). Gate 4 may be defined as one of the gates shown in FIG. 1.

Method 400 then includes reading rule identifications of all the fields from a rule identification field mapping table and building a hash map with field name as a key and an array list of rule identifications associated with the field as value for gate 7 (operation 406). Gate 7 may be defined as one of the gates shown in FIG. 1.

Method 400 then includes reading dependency information for all the rule identifications from a rule dependency table and building a hash map with rule identification as a key and an array list of immediate parent or predecessor rule identifications of the key (operation 408). Method 400 then includes reading a rules execution engine file generated for gate 4 and creating an executable rules execution engine knowledge session (operation 410). The gate for this operation may be defined as one of the gates shown in FIG. 1. The knowledge base is a repository of all the application's knowledge definitions. It contains rules, processes, functions, type models. The knowledge base itself does not need to contain runtime data, but instead, sessions are created from the knowledge base in which data can be inserted and process instances started. Creating the knowledge base can be labor intensive from a work perspective, whereas session creation is very light from a work perspective. Thus, the knowledge base be cached where it is possible to allow for repeated session creation.

Method 400 then includes reading the DRL file generated for gate 7 and creating an executable rules execution engine knowledge session (operation 412). In one illustrative embodiment, the method may terminate thereafter.

Method 400 may be further varied. More or fewer operations may be present. The operations themselves may also be varied. Thus, method 400 does not necessarily limit the claimed inventions.

Figure 5A:
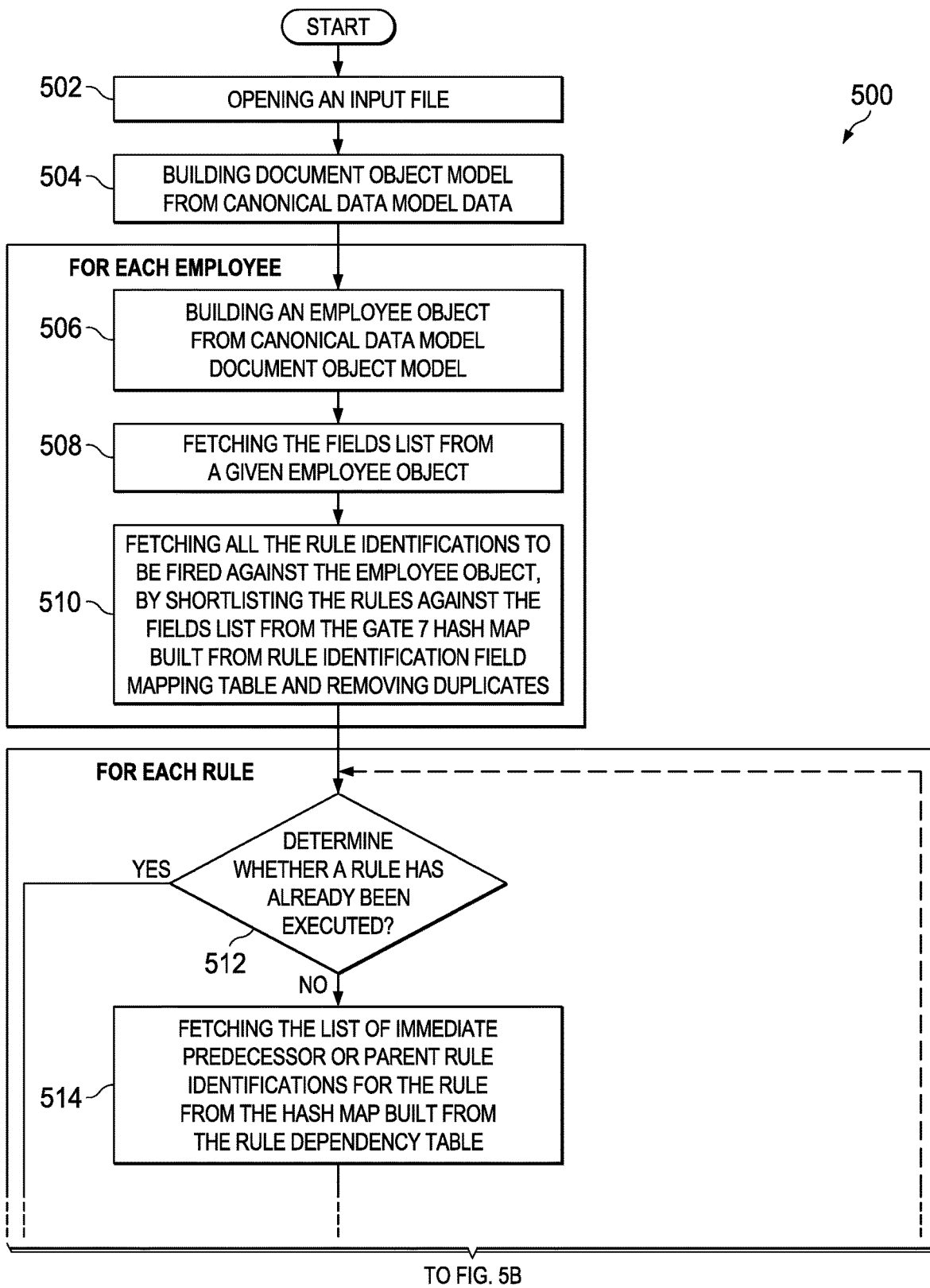
FIG. 5A is a flowchart of processing an input file when checking for root causes of computer-related error in a multi-level tax data validation engine in accordance with an illustrative embodiment.
Figure 5B:
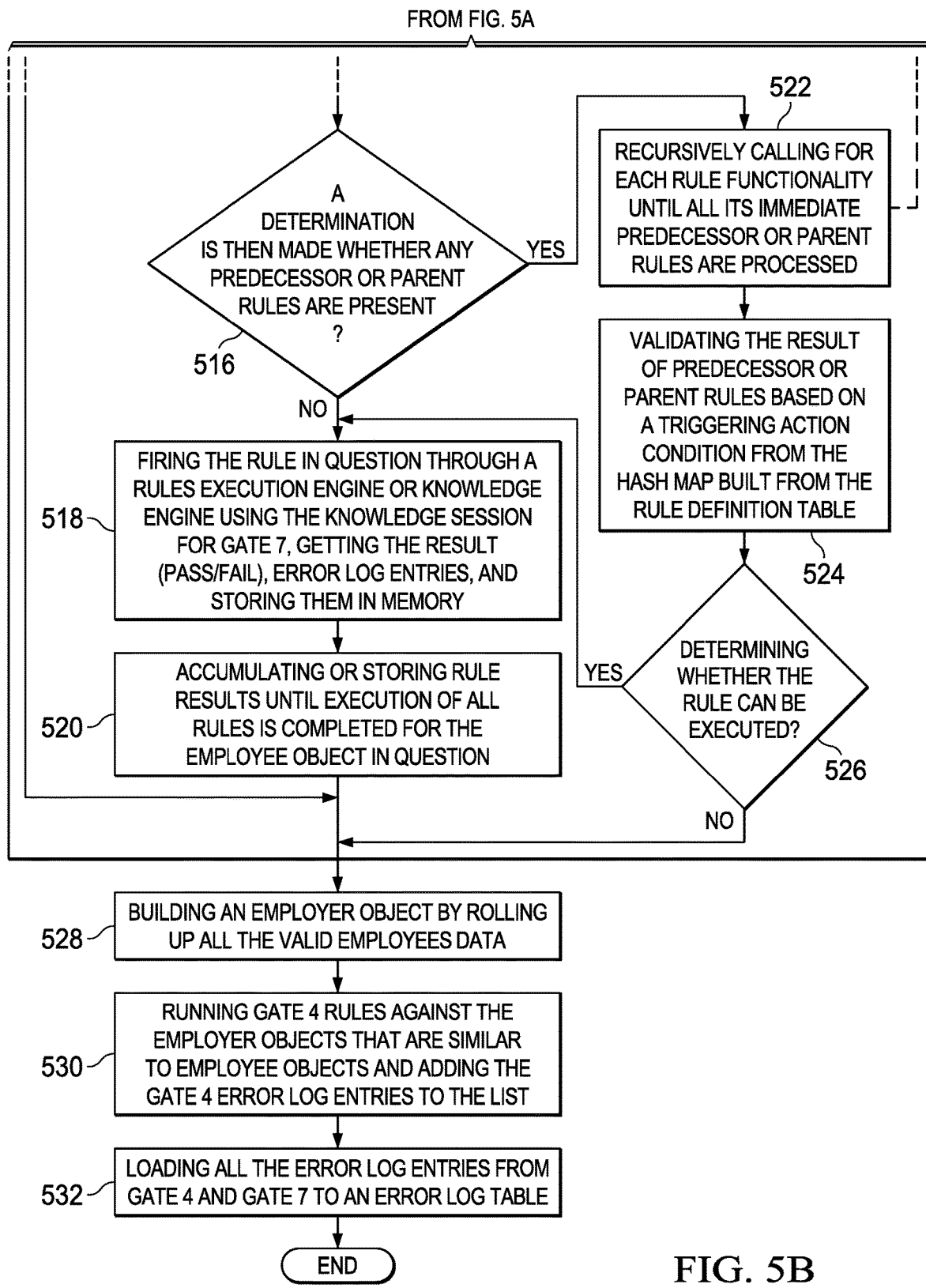
FIG. 5B is a flowchart of processing an input file when checking for root causes of computer-related error in a multi-level tax data validation engine in accordance with an illustrative embodiment.

FIG. 5A is a flowchart of processing an input file when checking for root causes of computer related error in a multi-level tax data validation engine, in accordance with an illustrative embodiment. FIG. 5B is a flowchart of processing an input file when checking for root causes of computer-related error in a multi-level tax data validation engine in accordance with an illustrative embodiment. FIG. 5A and FIG. 5B are part of the same method, and thus share reference numerals.

Method 500 may be implemented using a processor. Method 500 may be implemented in a system, such as integration system 200 of FIG. 2. Method 500 may include using some information created by method 400 of FIG. 4.

Method 500 may begin with opening an input file (operation 502). Method 500 then builds a document object model (DOM) from canonical data model (CDM) data (operation 504). "DOM" stands for "document object model". This model defines the logical structure, such as a tree structure, of the data the system receives. "CDM" stands for "canonical data model." This model is the standard data format to exchange information between various business units in a software enterprise.

Subsequent operations 506, 508, and 510 are performed for each employee, or more accurately each employee record. After operation 504, method 500 then builds an employee object from canonical data model (CDM) to form document object model (DOM) (operation 506). In other words, the system reads the incoming data in canonical data model (CDM) and forms a document object model (DOM) that eases further processing.

Method 500 then fetches the fields list from a given employee object (operation 508). Method 500 then fetches all the rule identifications to be fired against the employee object, by shortlisting the rules against the fields list from the gate 7 hash map built from rule identification field mapping table and removing duplicates (operation 510).

Subsequent operations 512, 514, 516, 518, 520, 522, 524, and 526 are all repeated for each rule to be validated. Method 500 then determines whether a rule has already been executed (operation 512). If the rule has already been executed, processing continues below in operation 528. However, if the rule has not yet been executed, the method 500 includes fetching the list of immediate predecessor or parent rule identifications for the rule from the hash map built from the rule dependency table (operation 514).

A determination is then made whether any predecessor or parent rules are present (operation 516). If not, then method 500 fires the rule in question through a rules execution engine or knowledge engine using the knowledge session for gate 7, getting the result (pass/fail), error log entries, and storing them in memory (operation 518).

Method 500 then accumulates or stores rule results until execution of all rules is completed for the employee object in question (operation 520). Method 500 then continues with operation 528, described below.

Returning to operation 516, if there are predecessor or parent rules present, then method 500 recursively calls for each rule functionality until all its immediate predecessor or parent rules are processed (operation 522). Method 500 then validates the result of predecessor or parent rules based on a triggering action condition from the hash map built from the rule definition table (operation 524). Method 500 then determines whether the rule can be executed (operation 526). If so, then method 500 returns to operation 518 and continues. If not, then method 500 continues with operation 528.

Method 500 then builds an employer object by rolling up all the valid employees data (operation 528). Method 500 then runs gate 4 rules against the employer objects that are similar to employee objects and adds the gate 4 error log entries to the list (operation 530). Gate 4 may be defined as one of the gates shown in FIG. 1. Method 500 then includes loading all the error log entries from gate 4 and gate 7 to an error log table (operation 532). Gate 4 and gate 7 may be defined as one of the gates shown in FIG. 1. The error log table may be stored for future use, and may be provided to the learning machine for training of the learning machine. The method may terminate thereafter.

Figure 6:
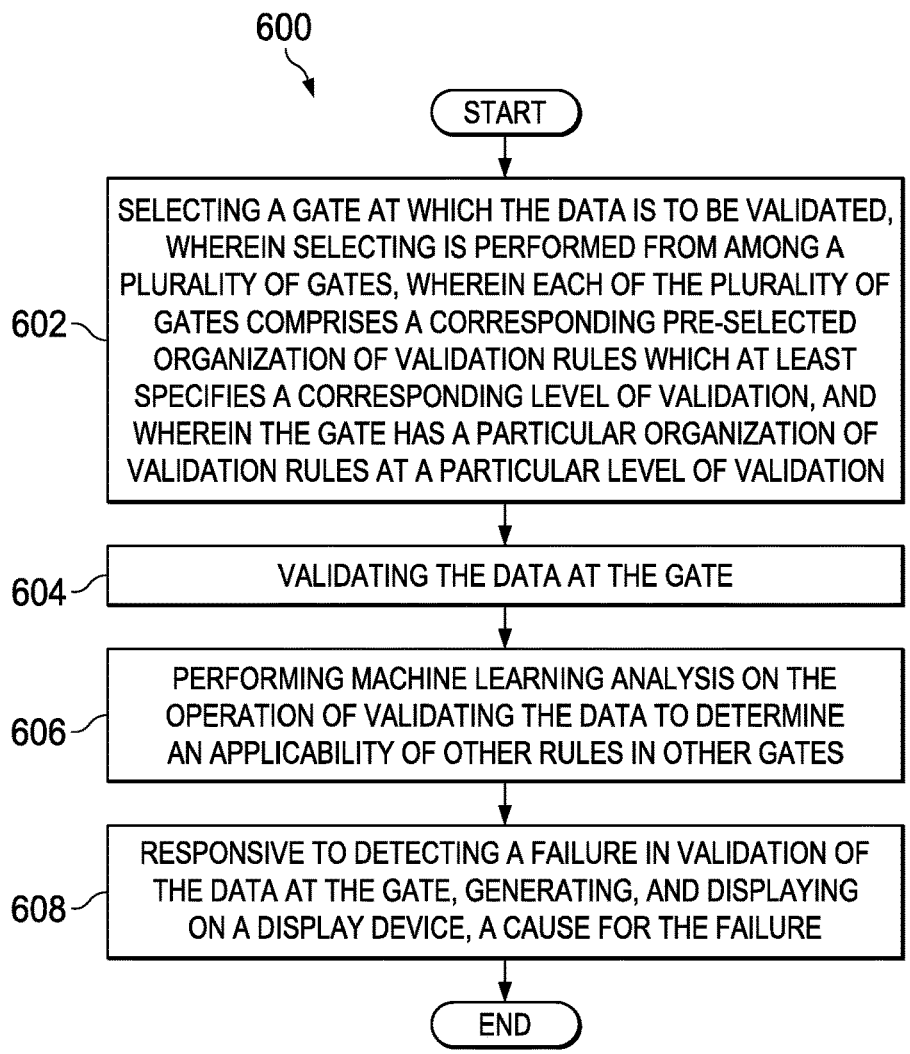
FIG. 6 is a flowchart for a computer-centric method for pinpointing the root cause of a computer-related error in a multi-level tax data validation engine in accordance with an illustrative embodiment.

FIG. 6 is a flowchart for a computer-centric method for pinpointing the root cause of a computer-related error in a multi-level tax data validation engine in accordance with an illustrative embodiment. Method 600 may be characterized as a method for computing validation and error discovery in computers executing a multi-level tax data validation engine. Method 600 may also be characterized as a computer-method for improving operation of a computer by validating incoming data provided to a tax evaluation software program. Method 600 may be executed by a processor in an environment, such as integration system 200 of FIG. 2. Method 600 may be executed including a learning machine, such learning machine 216 as shown in FIG. 2.

Method 600 may begin by selecting a gate at which the data is to be validated, wherein is selecting is performed from among a plurality of gates, wherein each of the plurality of gates comprises a corresponding pre-selected organization of validation rules which at least specifies a corresponding level of validation, and wherein the gate has a particular organization of validation rules at a particular level of validation (operation 602). Method 600 then validates the data at the gate (operation 604).

Method 600 then performs machine learning analysis on the operation of validating the data to determine an applicability of other rules in other gates (operation 606). Method 600 may also respond to detecting a failure in validation of the data at the gate, generating, and displaying on a display device, a cause for the failure (operation 608). In one illustrative embodiment, the method may terminate thereafter.

Method 600 may be varied. For example, selecting the gate may be based on a desired granularity of validation. In another example, the plurality of rules comprise thousands of rules of sufficient complexity so that only a computer can use machine learning to organize and check all of the plurality of rules. In still another example, recognizing the failure of validation comprises a recognition that other rules in other gates should apply to validating the data.

Method 600 may also have additional operations. For example, method 600 may also include, responsive to the machine learning analysis determining that a given validation rule in a different gate is applicable to validating the data, detecting the failure. Method 600 may also include, responsive to detecting the failure, re-validating the data at a different gate, the different gate being at a higher level of granularity.

In another illustrative embodiment, method 600 may include several additional steps. For example, method 600 may also include repeating operations of selecting, validating, and performing machine learning for a plurality of additional sets of tax data at different ones of the plurality of gates. In this case, method 600 further includes responsive to the machine learning analysis determining that one or more given validation rules in different gates are applicable to particular ones of the plurality of additional sets of tax data, detecting the failure. Additionally, for this example, method 600 further includes responsive to detecting the failure, re-validating only the particular ones of the plurality of additional sets of tax data at different gates at higher levels of granularity, whereby operation of the computer to validate all of the sets of tax data is increased in speed by applying only needed levels of granularity of data validation.

In yet another illustrative embodiment, method 600 may also include detecting the failure, and wherein displaying the cause comprises displaying a specific data field, from among the data, which caused the failure. In still another illustrative embodiment, method 600 may also include detecting the failure, wherein displaying the cause comprises displaying a reason why a rule failed. In another illustrative embodiment, method 600 may also include detecting the failure, wherein displaying the cause comprises displaying exactly what aspects of the data failed validation and why the data failed validation.

In another example, method 600 also includes detecting the failure. In this case, method 600 also includes determining whether detecting the failure is a false positive by applying a plurality of chained rules to check whether the data that failed validation instead represents a legitimate outlier of data that is actually valid.

Method 600 may be further varied. For example, method 600 may include more, fewer, or different operations. Thus, the advantageous embodiments shown in FIG. 6 do not necessarily limit the claimed inventions. Likewise, the advantageous embodiments shown in FIG. 6 do not necessarily limit the other examples given above in FIG. 1 through FIG. 5A and FIG. 5B. Other variations are possible.

Figure 7:
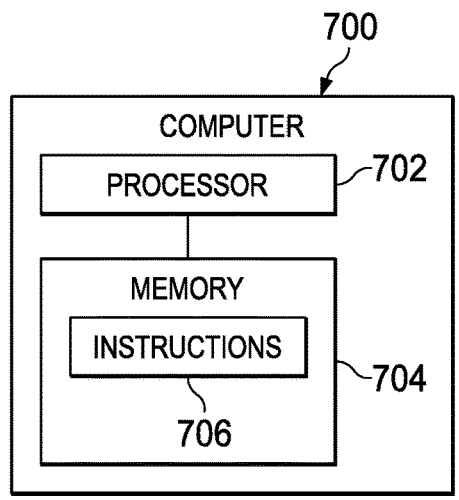
FIG. 7 is a block diagram of a computer system configured to pinpoint the root cause of a computer-related error in a multi-level tax data validation engine in accordance with an illustrative embodiment.

FIG. 7 is a block diagram of a computer system configured to pinpoint the root cause of a computer-related error in a multi-level tax data validation engine, in accordance with an illustrative embodiment. Computer 700 may be a data processing system, such as data processing system 800 of FIG. 8. Computer 700 may be used to implement any of the methods described above with respect to FIG. 3 through FIG. 6.

Computer 700 includes processor 702 in communication with memory 704. Memory 704 is a non-transitory computer-readable storage medium. Memory 704 stores instructions 706 which, when executed by processor 702, performs a computer-implemented method for improving operation of a computer by validating incoming data provided to a tax evaluation software program.

Instructions 706 may include instructions for selecting a gate at which the data is to be validated. Selection may be performed from among a plurality of gates. Each of the plurality of gates may be a corresponding pre-selected organization of validation rules, which at least specifies a corresponding level of validation. The gate has a particular organization of validation rules at a particular level of validation.

Instructions 706 also may include instructions for validating the data at the gate. Instructions 706 also may include instructions for performing machine learning analysis on the operation of validating the data to determine an applicability of other rules in other gates. Instructions 706 also may include instructions for responding to detecting a failure in validation of the data at the gate, generating, and displaying, on a display device, a cause for the failure.

Computer 700 and the instructions recorded on the memory may be further varied. For example, the instructions for selecting the gate may be based on a desired granularity of validation. In another example, the plurality of rules comprise thousands of rules of sufficient complexity that only a computer can use machine learning to organize and check all of the plurality of rules. In still another example, recognizing the failure of validation comprises a recognition that other rules in other gates should apply to validating the data.

In still another example, instructions 706 may further include instructions for responsive to the machine learning analysis determining that a given validation rule in a different gate is applicable to validating the data, detecting the failure. In yet another example, instructions 706 may further include instructions for responsive to detecting the failure, re-validating the data at the different gate, the different gate being at a higher level of granularity.

In another example, instructions 706 may further include instructions for repeating operations of selecting, validating, and performing machine learning for a plurality of additional sets of tax data at different ones of the plurality of gates. In this case, instructions 706 also include instructions for responses to the machine learning analysis determining that one or more given validation rules, in different gates, are applicable to particular ones of the plurality of additional sets of tax data, detecting the failure. Additionally, in this case, instructions 706 also include instructions for responses to detecting the failure, re-validating only the particular sets of data of the plurality of additional sets of tax data at different gates at higher levels of granularity, whereby operation of the computer to validate all of the sets of tax data is increased in speed by applying only the needed levels of granularity of data validation.

In still another example, instructions 706 may further include instructions for detecting the failure. In this case, the instructions may further include instructions for determining whether detecting the failure is a false positive by applying a plurality of chained rules to check whether the data that failed validation instead represents a legitimate outlier of data that is actually valid.

Computer 700 may be further varied. For example, memory 704 may include more, fewer, or different instructions. Thus, the advantageous embodiments shown in FIG. 7 do not necessarily limit the claimed inventions. Likewise, the advantageous embodiments shown in FIG. 7 do not necessarily limit the other examples given above in FIG. 1 through FIG. 6. Other variations are possible.

Figure 8:
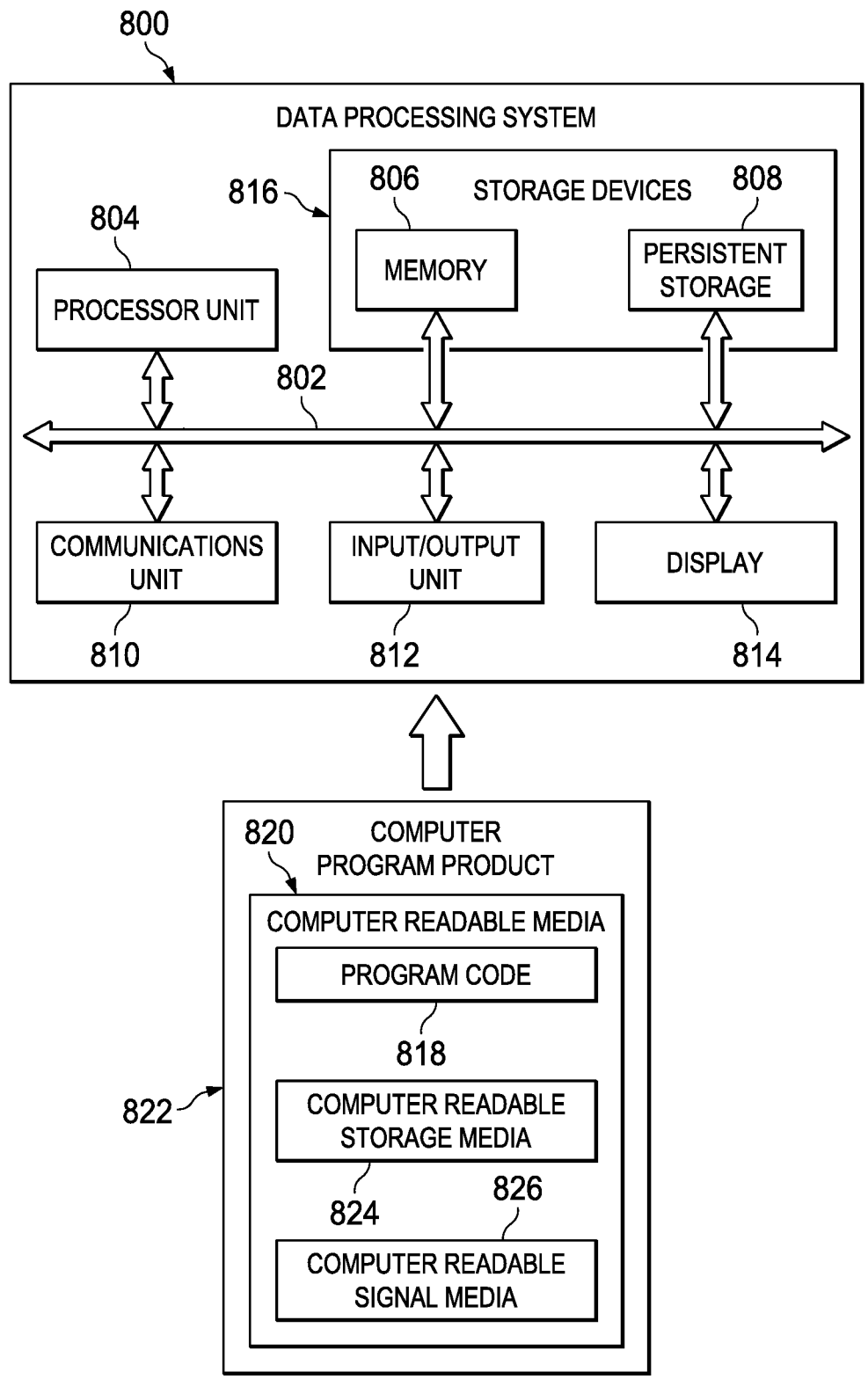
FIG. 8 is a block diagram of a data processing system depicted in accordance with an illustrative embodiment.

FIG. 8 is a block diagram of a data processing system depicted in accordance with an illustrative embodiment. Data processing system 800 is an example of a computer as described with respect to FIG. 1 through FIG. 7.

In this illustrative example, data processing system 800 includes communications framework 802, which provides communications between processor unit 804, memory 806, persistent storage 808, communications unit 810, input/output unit 812, and display 814. In this example, communication framework may take the form of a bus system.

Processor unit 804 serves to execute instructions for software that may be loaded into memory 806. Processor unit 804 may be a number of processors, a multi-processor core, or some other type of processor, depending on the particular implementation.

Memory 806 and persistent storage 808 are examples of storage devices 816. A storage device is any piece of hardware that is capable of storing information, such as, for example, without limitation, at least one of data, program code in functional form, or other suitable information either on a temporary basis, a permanent basis, or both on a temporary basis and a permanent basis. The program code may be instructions 706 of FIG. 7. Storage devices 816 may also be referred to as computer-readable storage devices in these illustrative examples. Memory 806, in these examples, may be, for example, a random access memory or any other suitable volatile or non-volatile storage device. Persistent storage 808 may take various forms, depending on the particular implementation.

For example, persistent storage 808 may contain one or more components or devices. For example, persistent storage 808 may be a hard drive, a flash memory, a rewritable optical disk, a rewritable magnetic tape, or some combination of the above. The media used by persistent storage 808 also may be removable. For example, a removable hard drive may be used for persistent storage 808.

Communications unit 810, in these illustrative examples, provides for communications with other data processing systems or devices. In these illustrative examples, communications unit 810 is a network interface card.

Input/output unit 812 allows for input and output of data with other devices that may be connected to data processing system 800. For example, input/output unit 812 may provide a connection for user input through at least of a keyboard, a mouse, or some other suitable input device. Further, input/output unit 812 may send output to a printer. Display 814 provides a mechanism to display information to a user.

Instructions for at least one of the operating system, applications, or programs may be located in storage devices 816, which are in communication with processor unit 804 through communications framework 802. The processes of the different embodiments may be performed by processor unit 804 using computer-implemented instructions, which may be located in a memory, such as memory 806.

These instructions are referred to as program code, computer-usable program code, or computer-readable program code that may be read and executed by a processor in processor unit 804. The program code in the different embodiments may be embodied on different physical or computer-readable storage media, such as memory 806 or persistent storage 808.

Program code 818 is located in a functional form on computer-readable media 820 that is selectively removable and may be loaded onto or transferred to data processing system 800 for execution by processor unit 804. Program code 818 and computer-readable media 820 form computer program product 822 in these illustrative examples. In one example, computer-readable media 820 may be computer-readable storage media 824 or computer-readable signal media 826.

In these illustrative examples, computer-readable storage media 824 is a physical or tangible storage device used to store program code 818 rather than a medium that propagates or transmits program code 818.

Alternatively, program code 818 may be transferred to data processing system 800 using computer-readable signal media 826. Computer-readable signal media 826 may be, for example, a propagated data signal containing program code 818. For example, computer-readable signal media 826 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 800 are not meant to provide architectural limitations to the manner in which different embodiments may be implemented. The different illustrative embodiments may be implemented in a data processing system including components, in addition to or in place of those, illustrated for data processing system 800. Other components shown in FIG. 8 can be varied from the illustrative examples shown. The different embodiments may be implemented using any hardware device or system capable of running program code 818.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Many modifications and variations will be apparent to those of ordinary skill in the art. Further, different illustrative embodiments may provide different features, as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A computer-implemented method for improving operation of a computer by validating incoming tax data provided to a tax evaluation software program, the computer-implemented method comprising:

receiving tax data;
selecting a gate from among a plurality of gates at which the tax data is to be validated, wherein selection of the gate is based on a desired granularity of validation, wherein:
  the plurality of gates comprises:
    a first set of gates comprising validation rules that apply to employees; and
    a second set of gates comprising validation rules that apply to employers;
  each of the plurality of gates comprises a corresponding pre-selected organization of validation rules that specifies a corresponding level of validation detail at which the tax data is validated by the corresponding gate, wherein the first set of gates comprises:
    a first gate consisting of validation rules that validate data type, data length, and formatting checks;
    a second gate consisting of validation rules that compute dependent wage components and tax fields at an employee level;
    a third gate consisting of validation rules that build employee rollups of atomic and computed fields at various levels; and
    a fourth gate consisting of validation rules that identify, execute, and take action based on validation rules against the rollup data at an employee level; and
  wherein the second set of gates comprises:
    a fifth gate consisting of validation rules that build employer rollups of atomic and computed fields at various levels;
    a sixth gate consisting of validation rules that compute dependent wage components and tax fields at an employer level which could not be computed at the employee level; and
    a seventh gate consisting of validation rules that identify, execute, and take action based on validation rules against the rollup data at an employer level;
validating the tax data at the gate, wherein the validation uses the corresponding organization of validation rules at a particular level of validation to determine:
  if the tax data is in a proper form to be processed;
  if the tax data is complete; and
  whether a different gate at a higher level of granularity is applicable to the tax data;
performing a machine learning analysis on the validation of the tax data, the machine learning analysis determining an applicability of other rules in other gates, the other rules different than the particular organization of validation rules, and wherein the machine learning analysis includes trend and pattern analysis of results of operation of a rules engine; and
responsive to detecting a failure in the validation of the tax data at the gate, generating, and displaying on a display device, a cause for the failure.

2. The computer-implemented method of claim 1, wherein a plurality of rules provided for machine learning analysis comprises thousands of rules of sufficient complexity such that only machine learning can be used to organize and check all of the plurality of rules.

3. The computer-implemented method of claim 1, wherein recognizing the failure comprises a recognition that the other rules in the other gates should apply to validating the tax data.

4. The computer-implemented method of claim 1 further comprising:
responsive to the machine learning analysis determining that a given validation rule in a different gate is applicable to validating the tax data, detecting the failure.

5. The computer-implemented method of claim 4 further comprising:
responsive to detecting the failure, re-validating the tax data at the different gate, the different gate being at a higher level of granularity than the gate.

6. The computer-implemented method of claim 1 further comprising:
repeating operations of selecting, validating, and performing machine learning for a plurality of additional sets of tax data at different ones of the plurality of gates;
responsive to the machine learning analysis determining that one or more given validation rules in different gates are applicable to particular ones of the plurality of additional sets of tax data, detecting the failure; and
responsive to detecting the failure, re-validating only the particular ones of the plurality of additional sets of tax data at different gates at higher levels of granularity, whereby operation speed of the computer to validate all of the plurality of additional sets of tax data is increased by applying only needed levels of granularity of data validation.

7. The computer-implemented method of claim 1 further comprising:
detecting the failure, and wherein displaying the cause comprises displaying a specific data field from among the tax data which caused the failure.

8. The computer-implemented method of claim 1 further comprising:
detecting the failure, wherein displaying the cause comprises displaying a reason why a rule failed.

9. The computer-implemented method of claim 1 further comprising:
detecting the failure, wherein displaying the cause comprises displaying what aspects of the tax data failed, and why the tax data failed.

10. The computer-implemented method of claim 1 further comprising:
detecting the failure; and
determining whether detecting the failure is a false positive by applying a plurality of chained rules to check whether the tax data that failed validation represents a legitimate outlier of tax data that is valid.

11. A computing device comprising:
a processor; and
a non-transitory, computer-readable storage medium comprising instructions for validating incoming data provided to a tax evaluation software program by causing the processor to:
select a gate from among a plurality of gates at which tax data is to be validated, wherein selection of the gate is based on a desired granularity of validation, wherein:
the plurality of gates comprises a first set of gates comprising validation rules that apply to employees and a second set of gates comprising validation rules that apply to employers;
each of the plurality of gates comprises a corresponding pre-selected organization of validation rules that specifies a corresponding level of validation, wherein the first set of gates comprises:
a first gate consisting of validation rules that validate data type, data length, and formatting checks;
a second gate consisting of validation rules that compute dependent wage components and tax fields at an employee level;
a third gate consisting of validation rules that build employee rollups of atomic and computed fields at various levels; and
a fourth gate consisting of validation rules that identify, execute, and take action based on validation rules against the rollup data at an employee level; and
wherein the second set of gates comprises:
a fifth gate consisting of validation rules that build employer rollups of atomic and computed fields at various levels;
a sixth gate consisting of validation rules that compute dependent wage components and tax fields at an employer level which could not be computed at the employee level; and
a seventh gate consisting of validation rules that identify, execute, and take action based on validation rules against the rollup data at an employer level;
at which the tax data is validated by the corresponding gate;
perform a validation of the data at the gate using corresponding organization of validation rules at the particular level of validation to determine:
if the tax data is in a proper form to be processed;
if the tax data is complete; and
whether a different gate at a higher level of granularity is applicable to the tax data;
perform a machine learning analysis on the validation of the tax data to determine an applicability of other rules in other gates, wherein the machine learning analysis includes at least one of trend analysis or pattern analysis; and
responsive to detecting a failure in the validation of the tax data at the gate, generate and display on a display device a cause for the failure.

12. The computing device of claim 11, wherein a plurality of rules provided for machine learning analysis comprises thousands of rules of sufficient complexity such that only machine learning can be used to organize and check all of the plurality of rules.

13. The computing device of claim 11, wherein recognizing the failure in the validation comprises a recognition that other rules in other gates should apply to validating the tax data.

14. The computing device of claim 11, wherein, responsive to the machine learning analysis determining that a given validation rule in a different gate is applicable to validating the tax data, detecting the failure.

15. The computing device of claim 14, responsive to detecting the failure, re-validating the tax data at the different gate, the different gate being at a higher level of granularity than the gate.

16. The computing device of claim 11, wherein validation of incoming data further comprises:
repeating operations of selecting, validating, and performing machine learning for a plurality of additional sets of tax data at different ones of the plurality of gates;
responsive to the machine learning analysis determining that one or more given validation rules in different gates are applicable to particular ones of the plurality of additional sets of tax data, detecting the failure; and responsive to detecting the failure, re-validating only the particular ones of the plurality of additional sets of tax data at different gates at higher levels of granularity, whereby operation speed of the computing device to validate all of the plurality of additional sets of tax data is increased by applying only needed levels of granularity of data validation.

17. The computing device of claim 11, wherein validation of incoming data further comprises:
detecting the failure; and
determining whether detecting the failure is a false positive by applying a plurality of chained rules to check whether the tax data that failed validation represents a legitimate outlier of tax data that is valid.

18. A computer program product comprising:
a non-transitory, computer-recordable storage medium including instructions for validating incoming data provided to a tax evaluation software application, the instructions comprising:
first program code for receiving tax data;
second program code for selecting a gate from among a plurality of gates at which the tax data is to be validated, wherein selection of the gate is based on a desired granularity of validation, wherein:
the plurality of gates comprises a first set of gates comprising validation rules that apply to employees and a second set of gates comprising validation rules that apply to employers;
each of the plurality of gates comprises a corresponding pre-selected organization of validation rules that specifies a corresponding level of validation detail at which the tax data is validated by the corresponding gate, wherein the first set of gates comprises:
a first gate consisting of validation rules that validate data type, data length, and formatting checks;
a second gate consisting of validation rules that compute dependent wage components and tax fields at an employee level;
a third gate consisting of validation rules that build employee rollups of atomic and computed fields at various levels; and
a fourth gate consisting of validation rules that identify, execute, and take action based on validation rules against the rollup data at an employee level; and
wherein the second set of gates comprises:
a fifth gate consisting of validation rules that build employer rollups of atomic and computed fields at various levels;
a sixth gate consisting of validation rules that compute dependent wage components and tax fields at an employer level which could not be computed at the employee level; and
a seventh gate consisting of validation rules that identify, execute, and take action based on validation rules against the rollup data at an employer level;
third program code for validating the data at the gate using corresponding organization of validation rules at the particular level of validation to determine:
if the tax data is in a proper form to be processed;
if the tax data is complete; and
whether a different gate at a higher level of granularity is applicable to the tax data;
fourth program code for performing a machine learning analysis on the validation of the data to determine an applicability of other rules in other gates, wherein the machine learning analysis includes trend and pattern analysis of results of operation of a rules engine; and
fifth program code for, responsive to detecting a failure in validation of the data at the gate, generating and displaying on a display device a cause for the failure.

19. The computer-implemented method of claim 1, wherein the validating the tax data at the gate and the performing the machine learning analysis are performed concurrently.

* * * * *